United States Patent [19]

Tomioka

[11] E Re. 30,323

[45] Reissued Jul. 1, 1980

[54] SMOKE DETECTOR ADAPTED TO A SMOKE SENSING APPARATUS

[75] Inventor: Yukio Tomioka, Sagamihara, Japan

[73] Assignee: Hochiki Kabushiki Kaisha, Japan

[21] Appl. No.: 940,156

[22] Filed: Sep. 5, 1978

Related U.S. Patent Documents

Reissue of:

[64] Patent No.: 3,935,466
Issued: Jan. 27, 1976
Appl. No.: 440,521
Filed: Jun. 18, 1971

U.S. Applications:

[63] Continuation of Ser. No. 860,357, Sep. 23, 1969, abandoned.

[30] Foreign Application Priority Data

Sep. 26, 1968 [JP] Japan ..... 43-69696
Mar. 11, 1969 [JP] Japan ..... 44-18458

[51] Int. Cl.[2] ..... G01T 1/18
[52] U.S. Cl. ..... 250/385; 250/380; 340/629
[58] Field of Search ..... 340/629; 250/385, 380

[56] References Cited

U.S. PATENT DOCUMENTS

| | | | |
|---|---|---|---|
| 2,408,051 | 9/1946 | Donelian | 340/237 S |
| 2,465,377 | 3/1949 | Jaeger | 340/237 S |
| 2,702,898 | 2/1955 | Meili | 340/629 |
| 2,759,174 | 8/1956 | Brailsford | 340/629 |
| 2,981,840 | 4/1961 | Nahmias | 250/380 |
| 2,994,768 | 8/1961 | Derfler | 340/237 S |
| 3,500,368 | 3/1970 | Abe | 340/629 |
| 3,514,603 | 5/1970 | Klein | 340/629 |
| 3,935,466 | 1/1976 | Tomioka et al. | 250/385 |

FOREIGN PATENT DOCUMENTS

| | | | |
|---|---|---|---|
| 1020771 | 2/1966 | United Kingdom | 340/629 |

*Primary Examiner*—Harold A. Dixon
*Attorney, Agent, or Firm*—Haseltine, Lake & Waters

[57] ABSTRACT

A smoke detector is disclosed which comprises an inner electrode, an intermediate electrode with a hole for passing radioactive rays therethrough, an outer electrode having openings for allowing smoke to flow therethrough, and one radioactive source, the inner and intermediate electrodes forming an inner ionization chamber, the intermediate and outer electrodes forming an outer ionization chamber, the radioactive source being disposed in the inner ionization chamber. A proper quantity of radioactive rays from the radioactive source is applied into the outer ionization chamber through the hole provided in the intermediate electrode.

6 Claims, 7 Drawing Figures

SMOKE DETECTOR ADAPTED TO A SMOKE SENSING APPARATUS

Matter enclosed in heavy brackets [ ] appears in the original patent but forms no part of this reissue specification; matter printed in italics indicates the additions made by reissue.

RELATED CASE

This application is a continuation of Ser. No. 860,357 filed Sept. 23, 1969, now abandoned.

BACKGROUND OF THE INVENTION

The present invention relates to improved smoke detectors adapted to a smoke sensing apparatus comprising a smoke detector and an electric indicating or alarm device including a relay such as, for example, a control electric valve the control electrode of which is connected to the output terminal of said smoke detector, and more particularly to smoke detectors in which a kind of radioactive substance is used in common in two ionization chambers.

Hitherto, as a method of detecting particles contained in any kind of smoke, it has been well known to utilize ionization of said particles. For this purpose, a smoke detector provided with two inner and outer ionization chambers each including a radioactive substance therein has been generally used, said outer chamber being denoted as an outer ionization chamber and being provided with a metal wire net for passing outer gas therethrough, and said inner chamber being denoted as an inner ionization chamber and being constructed so that penetration of said outer gas into said inner ionization chamber is very difficult.

In the conventional smoke detectors as mentioned above, there are disadvantages such that the detector becomes large in its structure, very complicated in its construction, and uneconomical because each of the inner and outer ionization chambers is provided with a radioactive substance therein, and, furthermore, the quantity of the radioactive rays is relatively large, thereby increasing harmful effects on human bodies.

Furthermore, in the conventional smoke detectors as mentioned above, precise detection at various temperature condition or precise detection unaffected by variation of the surrounding temperature is very difficult and simple temperature compensation or alarming of an emergency temperature itself cannot be attained. For the purpose of temperature compensation of the smoke detectors, various compensating circuits utilizing any kind of various thermistors have been conventionally utilized, but these circuits are relatively complex and cause expensive structure of the smoke detector provided with said circuit.

SUMMARY OF THE INVENTION

It is therefore an essential object of the present invention to provide improved smoke detectors adapted to a smoke sensing apparatus comprising a smoke detector and an electric indicating or alarm device the input of which is connected to the output terminal of said smoke detector, and having no disadvantages of the conventional smoke detectors mentioned already.

Said object and other objects of the invention have been attained, according to the invention, by a smoke detector which comprises outer, inner and intermediate electrodes, said intermediate electrode forming an inner ionization chamber therein and said outer and intermediate electrodes forming an outer ionization chamber therebetween, and comprises a radioactive substance provided in a position of said inner chamber to cause ionization in said chambers.

The objects, characteristic features and function of the invention will be described in detail in conjunction with the accompanying drawings, in which the same or equivalent members are designated by the same reference numerals and characters.

DETAILED DESCRIPTION OF THE INVENTION

Figure 1:
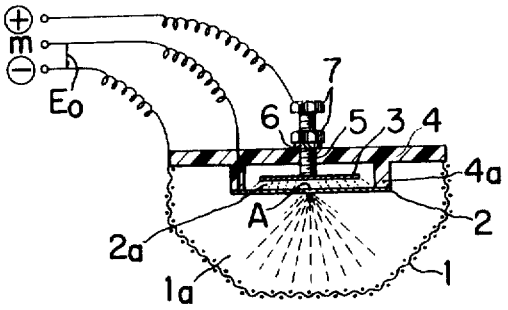
FIG. 1 is a schematic side view, in section, for showing the principle of an example according to the invention.

One example of the invention as illustrated in FIG. 1 comprises an insulating support member 4 made of a synthetic resin having a large electrical resistance, a metal wire net 1 functioning as an outer electrode, an [intermediated] *intermediate* electrode 2 supported by a projecting wall 4a of the member 4, an inner electrode 3 made of a radioactive substance, and an inner electrode supporting member 5 provided with a washer 6 and nuts 7, said outer and intermediate electrodes forming an outer ionization chamber 1a and an inner ionization chamber 2a being formed at the position inside said intermediate electrode. The intermediate electrode 2 is provided with at least one small hole A [or a membrane (not shown)] which is permeable to any radioactive ray therethrough. The examples of the invention, including the example of FIG. 1, relate to only the case in which only one small hole is provided in the intermediate electrode 2. Furthermore, in the example of FIG. 1, the inner electrode 3 itself is made of a radioactive substance, but a radioactive substance may be attached onto a separately provided inner electrode[, or the intermediate electrode may be made of a radioactive substance or may be provided with a radioactive substance attached thereto. Of course, a radioactive member may be provided at a position in the outer ionization chamber, with the same effect as the other cases]. In the example of FIG. 1, the intermediate electrode is in the form of a circular plate, but said electrode may be replaced by a linear element or elements.

The operation of the example of FIG. 1 will now be described below.

The detector is designed so that when the atmosphere surrounding the detector is in normal condition, the output voltage $E_o$ between the intermediate electrode 2 and the outer electrode 1 does not energize a smoke sensing apparatus which is not shown, said apparatus comprising a smoke detector to be improved by use with this invention and an electric indicating or alarm device, the input of which is connected to output terminals of said smoke detector. The said indicating or alarm device can be provided with an electric valve having a control electrode which is energized by abnormal energy produced in the smoke detector, but since said indicating or alarm device is ordinarily a conventional one and has no direct relation to the inventive concept of the invention, a detailed description of said device is herein omitted. When a fire breaks out and smoke containing particles therein enters the ionization chamber 1a through the meshes of the outer electrode 1, ionized air ions produced by ionization of the air due to the radioactive substance in the chamber 1a are adsorbed on said smoke particles thereby to cause recombination of the ions, or these smoke particles absorb radiation energy of the radioactive substance so as to disturb the ionization, said adsorption and absorption being caused by the extremely large dimension of said smoke particles in comparison with that of the air particles, whereby the ion current flowing through the ionization chambers is decreased relative to that in the normal condition, and the electric potential at the terminal m, that is, the voltage $E_o$ is remarkably increased. Accordingly, the smoke sensing apparatus can be made to operate by said increased voltage $E_o$. The fine hole A of the intermediate electrode 2 is adapted to disturb penetration of the smoke particles into the inner ionization chamber 2a, but to facilitate efficient radiation of radioactive rays into the ionization chamber 1a. Accordingly, the constructions of said members can be modified within the concept mentioned above. In the above case, the voltage-current characteristic of the ion current is determined depending upon the strength of the radioactive substance, dimensions and structures of the electrodes and the like. Furthermore, for the purpose of compensating for the effects caused by the surrounding conditions such as temperature, moisture and atmospheric pressure, it is preferable that the outer ionization chamber directly sensing the smoke has an unsaturated characteristic with respect to the ion current, and the inner ionization chamber has a characteristic saturatable at a relatively low voltage, said inner ionization chamber exhibiting high resistance to infiltration of the smoke thereinto, but being freely communicated with the outer air.

Figure 2:
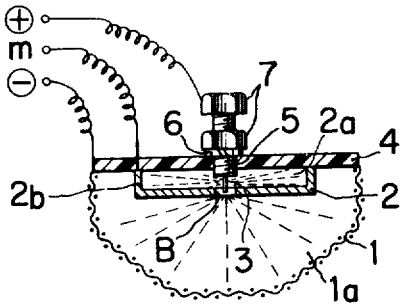
FIG. 2 is a sectional side view for showing another example of the invention, corresponding to FIG. 1.

The example of FIG. 2 is substantially the same as that shown in FIG. 1, except that the inner electrode 3 made of a radioactive substance has a pin-shaped form and projects centrally into a hole B provided in the intermediate electrode 2, and the projecting wall 4a in FIG. 1 is replaced by a side wall 2b of the intermediate electrode 2.

Figure 3:
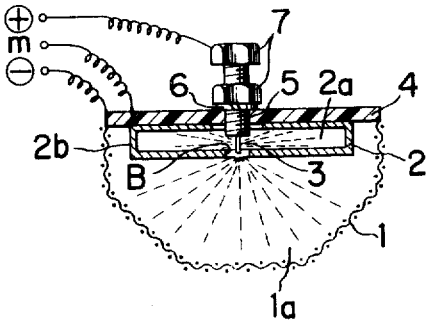
FIG. 3 is a sectional view for showing a further example of the invention, corresponding to FIG. 1.

The example of FIG. 3 is substantially the same as that of FIG. 2 except for the structure of the intermediate electrode 2.

According to the examples of FIGS. 1, 2 and 3, a radioactive member is utilized in common for the inner and outer ionization chambers, and the inner ionization chamber is provided inside the outer ionization chamber, so that the detector is miniaturized and can be manufactured at low cost.

In the example as illustrated in FIGS. 1 to 3, operation of the detector is affected by the surrounding temperature, so that precise smoke detection at a certain temperature or generation of an indication or alarm at a particular temperature cannot be attained unless some temperature compensating method is adopted. According to the invention, however, the devices as illustrated in FIGS. 1 to 3 can be effectively modified so as to have none of the disadvantages mentioned above, for example, by constructing the intermediate electrode from a material the condition of which is varied in response to temperature variation, adjusting automatically the relative distance between the intermediate and inner electrodes, varying automatically the position of the inner electrode having the radioactive substance, or adjusting the distance between the intermediate electrode and outer electrode, thereby to compensate irregularity of sensitivity with respect to the surrounding temperature. Furthermore, for the purpose of operating the smoke detector at a particular temperature, the detector can be designed so that it may be operated upon deviation of the distance between the intermediate electrode and the inner electrode or the outer electrode from a limit value, or it may be operated when radiation of the radioactive rays into the outer ionization chamber is cut off at a specific temperature.

Figure 4:
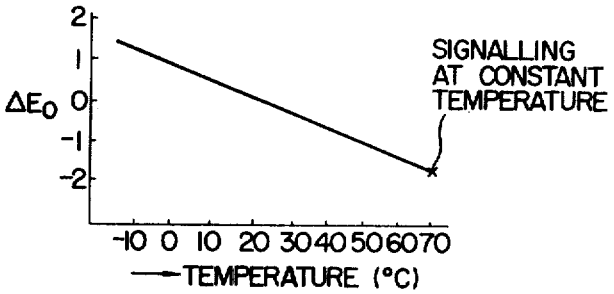
FIG. 4 is graph showing the relation between output voltage deviation $\Delta E$ of the device, as illustrated in FIGS. 1, 2 or 3, and the surrounding temperature.

In the example of FIG. 1, deviation $\Delta E_o$ of the electric voltage $E_o$ with respect to the surrounding temperature is shown in FIG. 4. This relation has been experimentally confirmed by the inventor of the present invention. The deviation $\Delta E_o$ mentioned above can be compensated according to the example illustrated in FIG. 5, in which the same numerals as those in FIG. 1 designate the same members as those in FIG. 1. However, in the example of FIG. 5, the intermediate electrode is made of a material such as, for example, a bimetal the condition or position of which can be varied in response to temperature variation, and the inner electrode 3 is provided with a radioactive substance 3a attached thereto, without itself being made of said substance.

Figure 5:
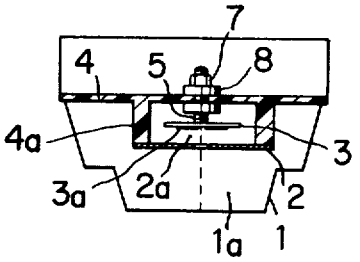
FIGS. 5 and 6 are schematic side views, partly in section, of other examples of the invention, respectively.

In the example of FIG. 5, if the temperature-responsive property of the intermediate electrode 2 is selected so that the relative distance between the intermediate and inner electrodes 2 and 3 may be automatically adjusted so as to compensate for the variation of the surrounding temperature, a constant smoke detecting sensitivity can be always obtained irrespective of the surrounding temperature. In this case, when the intermediate electrode is moved so as to decrease the relative distance between the intermediate and inner electrodes, low temperature compensation is achieved. On the contrary, when the intermediate electrode is moved so as to increase the relative distance mentioned above, high temperature compensation is achieved.

For the sake of operating the detector illustrated in FIG. 5 upon elevation of the surrounding temperature to a certain temperature, for instance, 70° C., the intermediate electrode 2 is designed so that said electrode 2 is moved by a necessary distance [a way] *away* from the inner electrode 3 in either an abrupt or gradual manner, thereby to increase the voltage $E_o$ up to a value sufficient to operate the smoke sensing apparatus, not shown.

Figure 6:
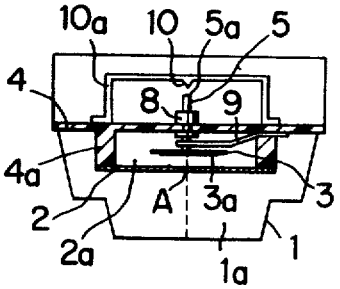

FIG. 6 shows a modification of the example of FIG. 5. In the case of the example of FIG. 6, the inner electrode 3 is supported on its support member 5 by means of the thermally responsive element 9 so as to be moved up and down, said support member 5 being passed through the insulating member 8 held by the insulating support member 4. The element 9 is made of, for example, a bimetal and designed to compensate for the influence caused by variation of the surrounding temperature. In the example of FIG. 6, an adjusting screw, not shown, adapted to adjust the [sensibility] *sensitivity* of the element 9 can be provided, or the end face 5a of the support member 5 and a contact 10 confronting said end face 5a and supported by an arm 10a can be utilized for signalling by alarm a specific emergency temperature, for example, 70° C., by inserting said end face 5a and contact 10 in the circuit of an alarm device of the smoke sensing apparatus, not shown.

Figure 7:
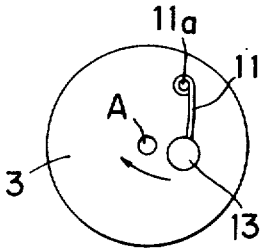
FIG. 7 is a plan view showing a part of a modification of the example illustrated in FIG. 6.

The examples of FIGS. 1 to 3 can be modified so that the detector may be operated at a specific temperature. For this purpose, for example, such a mechanism as shown in FIG. 7 is additionally provided in the detector, said mechanism comprising a bimetal 11 attached at its one end to the intermediate electrode 3 by means of a support pin 11a and provided at its other end with a shield plate 13. If the bimetal 11 is designed so that when the temperature becomes a predetermined specific value, said bimetal 11 is turned in the direction of the arrow so as to shut the hole A of the intermediate electrode 3, whereby penetration of radioactive rays into the outer ionization chamber is stopped and the ion current flowing through said chamber disappears, the voltage $E_o$ shown in FIG. 1 is abruptly increased at said specific temperature, thereby to operate a control electric valve, not shown.

I claim:

1. An ionization-type smoke detector *having only a single radioactive source,* comprising: an inner electrode provided with [a] *said single* radioactive source; an intermediate electrode having at least one throughhole; and an outer electrode having openings through which smoke can enter; *an insulating support member supporting said inner electrode, said intermediate electrode and said outer electrode; and an annular wall means projecting from said support member at a position inwardly of the outer circumference of said support member;* said inner electrode and said intermediate electrode forming an inner ionization chamber in which said radiation source is arranged, said intermediate electrode and said outer electrode forming an outer ionization chamber, said inner ionization chamber being [arranged inside] *located in a topmost portion of* said outer ionization chamber *which surrounds the inner ionization chamber, said intermediate electrode being secured to said annular wall means such that the surfaces thereof define said inner ionization chamber,* and wherein a necessary quantity of radioactive rays emitted from said radioactive source is introduced directly into said outer ionization chamber through said holes.

2. A smoke detector as defined in claim 1, in which said inner electrode is movable upwardly and downwardly.

[3. A smoke detector as defined in claim 1, in which said inner electrode is movable upwardly and downwardly.]

[4. A smoke detector as defined in claim 1, in which said inner electrode is supported on a supporting member having an annular projecting wall, and wherein said intermediate electrode is secured to said annular projecting wall.]

5. An ionization-type smoke detector *having only a single radioactive source,* which comprises: an inner ionization chamber; an outer ionization chamber within which said inner chamber is [positioned] *located at a topmost portion thereof;* an intermediate electrode common to both of said chambers and forming a boundary therebetween; an inner electrode positioned within said inner chamber; an outer electrode defining the outer boundary of said outer chamber and having openings therein through which smoke can freely pass; *an insulating support member supporting said inner electrode, said intermediate electrode and said outer electrode; and an annular wall means projecting from said support member at a position inwardly of the outer circumference of said support member;* said inner electrode being provided with [a] *single* radioactive source positioned within said inner chamber; *said intermediate electrode being secured to said annular wall means such that the surfaces thereof define said inner ionization chamber,* said intermediate electrode including aperture means formed therein [for substantially preventing smoke from entering said inner chamber from said outer chamber and] *for substantially preventing smoke from entering said inner chamber from said outer chamber and* for facilitating the passage of radiation from said inner chamber into said outer chamber in order to improve the ionization efficiency therein, said aperture means comprising an unobstructed hole formed through said intermediate electrode.

[6. The smoke detector as set forth in claim 5, further comprising: an insulating support member having an annular wall projecting therefrom at a position inwardly of the outer circumference thereof; said intermediate electrode being secured to said annular wall such that the inner surfaces thereof define said inner ionization chamber; the portion of said support member outside said annular wall forming a boundary for said outer ionization chamber; said outer electrode being secured to the outer circumference of said member.]

*7. A smoke detector as defined in claim 1, in which said annular wall means consists of a projecting annular wall of said support member, the portion of said support member inside said annular wall forming a boundary for the top of said inner ionization chamber; the portion of said support member outside said annular wall forming a boundary for the top of said outer ionization chamber; said outer electrode being secured to the outer circumference of said support member.*

*8. A smoke detector as defined in claim 1, in which said annular wall means consists of a side wall of said intermediate electrode; the portion of said support member inside said side wall forming a boundary for the top of said inner ionization chamber; the portion of said support member outside said side wall forming a boundary for the top of said outer ionization chamber; said outer electrode being secured to the outer circumference of said support member.*

*9. A smoke detector as defined in claim 5 in which said annular wall means consists of a projecting annular wall of said support member, the portion of said support member inside said annular wall forming a boundary for the top of said inner ionization chamber; the portion of said support member outside said annular wall forming a boundary for the top of said outer ionization chamber; said outer electrode being secured to the outer circumference of said support member.*

* * * * *